United States Patent
Redfern (10) Patent No.: US 7,075,999 B2
(45) Date of Patent: Jul. 11, 2006

(54) MULTICARRIER MODULATION WITH DATA DEPENDENT FREQUENCY-DOMAIN REDUNDANCY

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 893 days.

(21) Appl. No.: 10/126,114

(22) Filed: Apr. 19, 2002

(65) Prior Publication Data

US 2003/0198299 A1 Oct. 23, 2003

(51) Int. Cl.
*H04K 1/10* (2006.01)

(52) U.S. Cl. .................................. 375/260

(58) Field of Classification Search ............... 375/295, 375/260, 259; 370/207, 208, 209, 210
See application file for complete search history.

(56) References Cited

U.S. PATENT DOCUMENTS 4,943,980 A 7/1990 Dobson et al.

OTHER PUBLICATIONS

Gatherer et al., "Controling clipping probability in DMT Transmission", *Proceedings of the Asilomar Conference on Signals, Systems, and Computers* (1997), pp. 578-584.

*Primary Examiner*—Emmanuel Bayard
(74) *Attorney, Agent, or Firm*—Abdul Zindani; W. James Brady, III; Frederick J. Telecky, Jr.

(57) ABSTRACT

A modem (10) for transmitting a discrete multitone modulated (DMT) signal over a communications channel (H) is disclosed. In the encoding of an input bitstream, unloaded subchannels in the DMT spectrum are assigned signal values so that a trailing portion of each block or frame of the resulting datastream are forced to a known value, for example zero. The known-valued trailing portion of each block provides the effect of a cyclic prefix, without necessitating the prepending of an actual cyclic prefix and incurring the corresponding data rate loss; alternatively, the effect of a cyclic prefix can be augmented by the forcing of the trailing portion of the blocks to known values.

43 Claims, 5 Drawing Sheets

MULTICARRIER MODULATION WITH DATA DEPENDENT FREQUENCY-DOMAIN REDUNDANCY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of communications, and is more specifically directed to multicarrier modulation communications, such as Digital Subscriber Line (DSL) communications.

An important and now popular modulation standard for DSL communication is Discrete Multitone (DMT). According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane. The number of available symbol values for each subchannel, and thus the number of bits in each symbol communicated over that subchannel, is determined during initialization of the DMT communications session. The number of bits per symbol for each subchannel (i.e., the "bit loading") is determined according to the signal-to-noise ratio (SNR) at the subchannel frequency, which is affected by the transmission channel noise and the signal attenuation at that frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. Typically, the SNR of some subchannels is so poor that these subchannels are unloaded, carrying no bits. DMT modulation thus maximizes the data rate over each subchannel, permitting high speed access to be carried out even over relatively noisy and attenuated twisted-pair lines.

DMT modulation also permits much of the signal processing to be carried out in the digital domain. Typically, a serial digital datastream to be transmitted incoming bitstream is arranged into symbols, one for each subchannel, with the symbol size depending on the bit loading as noted above. Reed-Solomon coding and other coding techniques are typically applied for error detection and correction. Modulation of the subchannel carriers is obtained by application of an inverse Discrete Fourier Transform (IDFT) to the encoded symbols, producing a discrete modulated time domain signal having signal components that are associated with each of the sub-carrier frequencies. This modulated signal is then serially transmitted. All of these DMT modulation operations can be carried out in the digital domain, permitting implementation of much of a DSL modem, and particularly much of the processing-intensive operations, in a single chip such as a Digital Signal Processor (DSP).

The discrete output time domain signal from the modulation is converted into a time-domain analog signal by a conventional digital-to-analog converter, and is communicated over the transmission channel to the receiving modem, which reverses the process to recover the transmitted data. Ideally, the DMT subchannels in the received signal are orthogonal so that the signal can be demodulated by a Discrete Fourier Transform (DFT).

However, the non-ideal impulse response of the transmission channel of course distorts the transmitted signal. The signal received by the receiving modem can be considered to be a convolution of the transmitted analog signal with the impulse response of the transmission channel. One may express the time-domain signal y(n) at the receiver, based on a transmitted time-domain signal x(n), as:

$$y(n)=x(n)\otimes h(n)$$

This expression simply states that the received signal y(n) is the time-domain convolution of the input signal x(n) with the channel impulse response h(n). In the ideal case, this time-domain expression can be expressed in the frequency-domain as:

$$Y(n)=X(n)\cdot H(n)$$

where X(n), H(n), and Y(n) are the respective frequency-domain representations of time-domain signals x(n), h(n), y(n). Considering that the transmitted signal x(n) is the IDFT of the symbol sequences at their respective subchannel frequencies, the frequency-domain spectrum X(n) corresponds to the symbols themselves. According to the DMT modulation technology, the receiver can therefore retrieve the symbols X(n) by removing the channel response H(n) from the DFT of the frequency-domain received signal Y(n). Preferably, this is performed by a single-tap frequency domain equalizer.

However, time domain convolution corresponds to frequency domain multiplication only if the input sequence is infinitely long, or if the input sequence is periodic. Because the number of subchannels is finite, however, the number of real-valued time-domain samples at the output of the transmitter IDFT (i.e., the "block" length) is also finite. Accordingly, it is useful to make the transmitted signal appear to be periodic, at a period on the order of the block length. A well-known technique for accomplishing this is to include a cyclic prefix with each transmitted block in the datastream. The cyclic prefix is generally defined as a number P of samples at the end of a block of samples in the output bitstream. These P samples are prepended to the block, prior to digital-to-analog conversion, so that the transmitted signal appears periodic. This apparent periodicity in the input sequence permits the use of a DFT to recover the modulating symbols in each subchannel, so long as the impulse response of the transmission channel, commonly referred to as the channel length, is less than the length of the cyclic prefix.

In effect, the cyclic prefix eliminates inter-symbol interference (ISI) between adjacent data frames, and inter-carrier interference (ICI) between subchannels. ISI generally arises from distortion and spreading of the transmitted signal over the channel, causing the end of one DMT symbol to overlap into the beginning of the next DMT symbol. ICI affects the independence of the subcarriers, resulting in loss of orthogonality among the subchannels, which in turn prevents separation of the modulating data on these subchannels at the receiver.

In order for the input sequence to appear periodic, so that the ISI interference is contained within the redundant prefix of the block, the cyclic prefix must be longer than the channel length. However, the effective data rate of the transmission is reduced by an amount corresponding to the length of the cyclic prefix. In the case of a signal with a block length of N samples and a cyclic prefix of P samples that is generated by prepending a copy of the last P samples of the block, the data rate is reduced by a factor:

$$\frac{N}{N+P}$$

A tradeoff between interference and data rate is thus present in conventional DMT communications.

By way of further background, the peak-to-average ratio (PAR) of signal amplitudes in DMT transmissions is defined as the ratio of the peak power level, for a sample, to the average power level over a sequence of samples in DMT transmissions without involving a loss of data rate. A method of reducing the PAR is described in Gatherer and Polley, "Controlling clipping probability in DMT transmission", *Proceedings of the Asilomar Conference on Signals, Systems, and Computers*, (1997), pp. 578–584, incorporated herein by this reference. According to this approach, the PAR is reduced by using unloaded subchannels, which are unsuitable for carrying data because of noise or attenuation, to carry a "signal" that contains no payload. This signal on the unloaded subchannels is selected to have the effect of reducing the amplitude of the time domain signal to below the PAR amplitude threshold, in most cases.

BRIEF SUMMARY OF THE INVENTION

It is therefore an object of this invention to provide a multicarrier modulation approach in which interference is eliminated without a cyclic prefix, and thus without resulting in the loss of data rate.

It is a further object of this invention to provide such a modulation approach in which, if a cyclic prefix is used, the effective length of the cyclic prefix is increased without increasing data rate loss.

It is a further object of this invention to provide such a modulation approach in which the samples at the trailing portion of the transmitted frame may be set to a specified value, for example zero, to permit conventional receiving circuitry to recover the transmitted signal.

It is a further object of this invention to provide such a modulation approach that is adaptive to channel conditions and to equalization capability at the receiver.

Other objects and advantages of this invention will be apparent to those of ordinary skill in the art having reference to the following specification together with its drawings.

The present invention may be implemented in a multicarrier modulation function, such as a transmitter for Digital Subscriber Line (DSL) modems. The modulation is carried out by an Inverse Discrete Fourier Transform (IDFT), in which some of the subchannels are defined as unused, or unloaded. Symbol values are derived for the unloaded subchannels that force the samples at the trailing portion of each frame to a known value, such as zero. The trailing portion of the previous frame thus appears as a cyclic prefix to the current frame, because the trailing portions of the frames are all defined in this manner. Accordingly, the benefits of a cycle prefix are obtained, with little or no data rate loss, because the prepending of the trailing portion of the frame is avoided. Alternatively, the effective length of the cyclic prefix can be increased with no loss of data rate, permitting existing receivers, without modification, to demodulate and decode signals that are transmitted according to this invention.

DETAILED DESCRIPTION OF THE INVENTION

The present invention will be described in connection with an example of its implementation in a transceiver, such as a Digital Subscriber Line (DSL) modem. It will be apparent to those skilled in the art having reference to this specification that this invention is particularly well-suited for use in such an application. However, it is also contemplated that this invention will be of similar benefit in many other applications that involve discrete multitone modulation (DMT), including both land line and wireless communications. It is therefore to be understood that these and other alternatives to the embodiment described below are contemplated to be within the scope of the invention as claimed.

Figure 1:
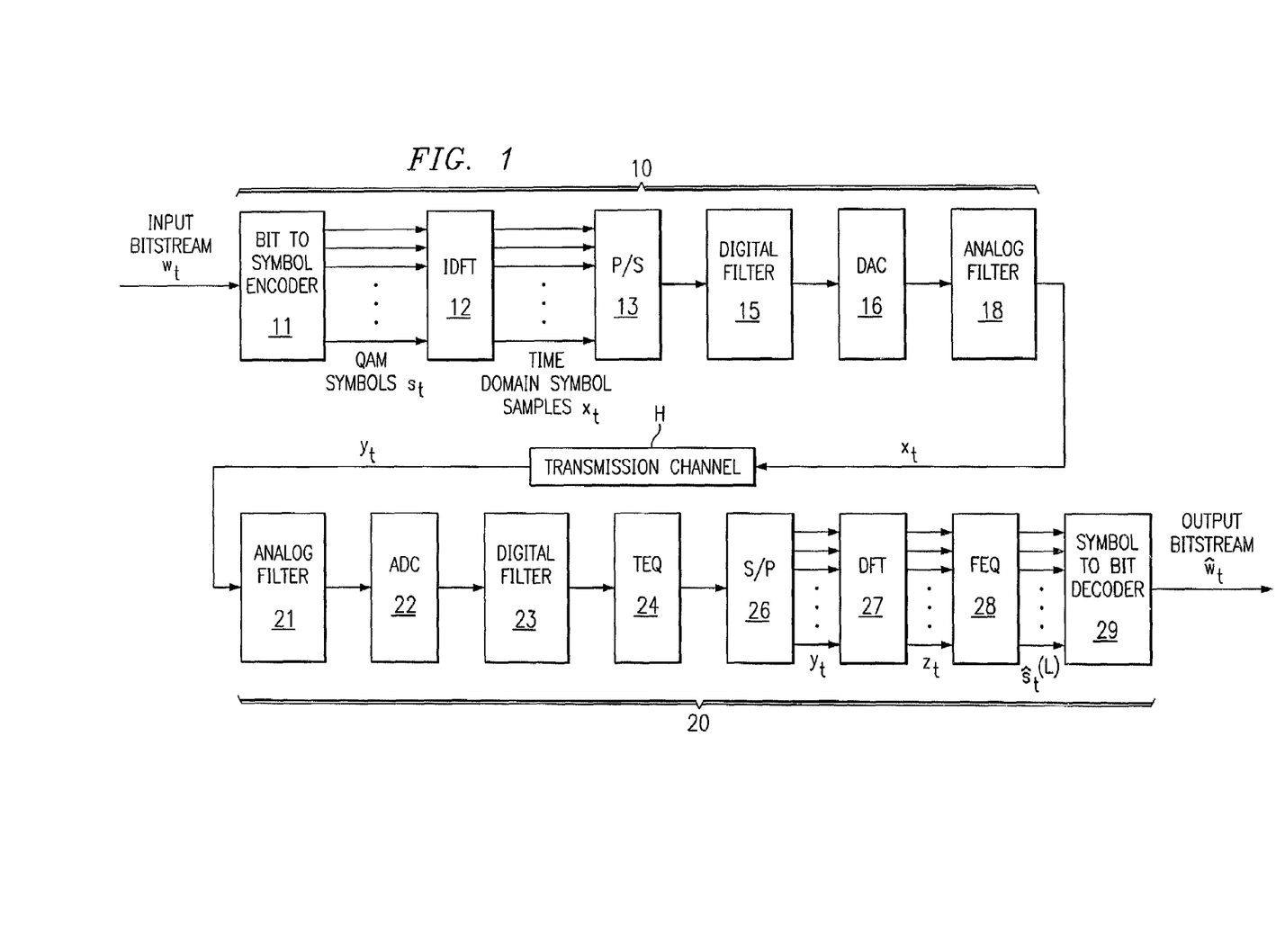
FIG. 1 is a functional block diagram of communications between two DMT transceivers, where at least the transmitting transceiver is constructed according to a first preferred embodiment of the invention.

FIG. 1 functionally illustrates an example of a DSL communication system into which the preferred embodiment of the invention is implemented. In the system of FIG. 1, only one direction of transmission (from transmitting modem 10 over transmission channel H to receiving modem 20) is illustrated. It will of course be understood by those skilled in the art that data will also be communicated in the opposite direction, in which case modem 20 will be the transmitting modem and modem 10 the receiving modem. According to this embodiment of the invention, the DSL communications carried out in the system of FIG. 1 are of the asymmetric DSL (ADSL) type, with communications in the opposing directions carried out in non-overlapping frequency bands according to frequency division multiplexing (FDM). In this arrangement, so-called "downstream" communication from the telephone company central office to the subscriber's modem is in a higher frequency band (e.g., above 138 kHz) while "upstream" communication from the subscriber to the central office is at a lower frequency band. For purposes of the present invention, FIG. 1 can be considered to illustrate the functions carried out in downstream communication, in which case transmitting modem 10 is at the central office and receiving modem 20 is the subscriber, or client, modem.

Figure 2:
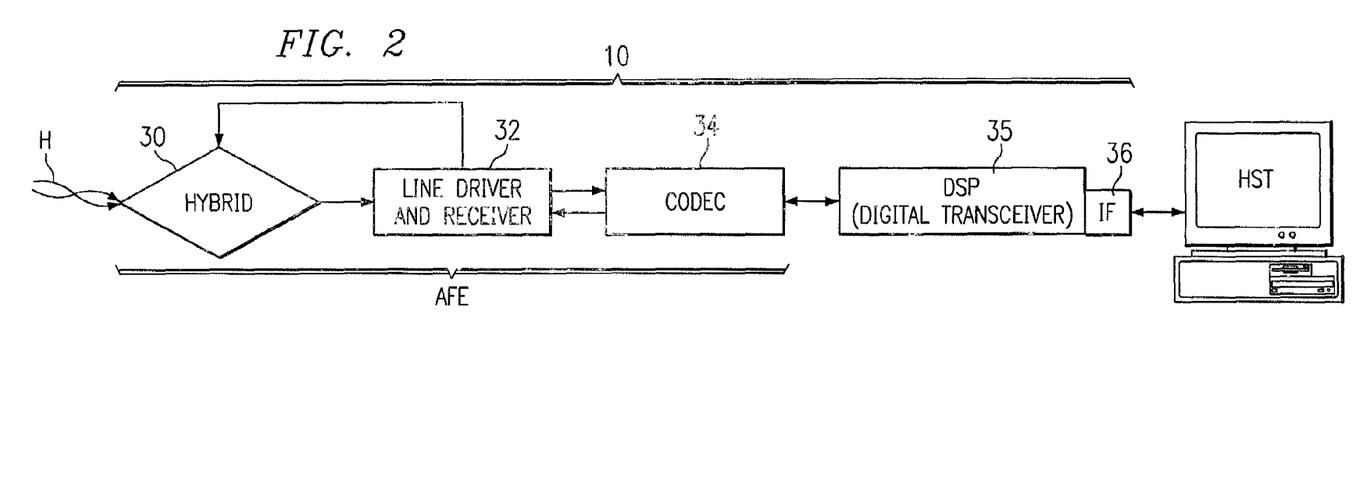
FIG. 2 is an electrical diagram, in block form, of a transceiver constructed according to the preferred embodiments of the invention.

FIG. 2 illustrates an exemplary construction of transmitting modem 10, in the form of a transceiver (i.e., for both transmitting and receiving). Modem 10 includes hybrid circuit 30, which is connected to the twisted-pair facility serving as transmission channel H. Hybrid circuit 30 is a conventional circuit that converts the two-wire arrangement of the twisted-pair facility to dedicated transmit and receive lines connected to line driver and receiver 32, considering that modem 10 is suitable for carrying out both receipt and transmission. Line driver and receiver 32 is a high-speed line driver and receiver for driving and receiving ADSL signals over twisted-pair lines; an example of line driver and receiver 32 is the THS7102 line driver/receiver available from Texas Instruments Incorporated. Line driver and receiver 32 is bi-directionally coupled to coder/decoder (codec) circuit 34, which carries out analog filtering, analog-to-digital conversion, and some amount of digital filtering, as will be described below. According to the preferred embodiment of the invention, in which the ADSL communications are carried out according to a frequency division multiplexing (FDM) scheme, the upstream and downstream communications are in separate, non-overlapping, frequency bands, in which case codec circuit 34 filters the incoming downstream signal to eliminate any interference from signals that it is transmitting. An example of a suitable codec device may be selected from the TLV320AD1x device family available from Texas Instruments Incorporated. Hybrid circuit 30, line driver and receiver 32, and codec 34 are often referred to, in the aggregate, as an "analog front end".

Modem 20 also includes DSP 35, which serves as a digital transceiver for DSL communications. As noted above, DSP 35 is a high performance digital signal processor, for carrying out digital operations in response to program instructions. These digital operations include the encoding of both loaded and unloaded subchannels are encoded in the manner according to the preferred embodiments of this invention, as will be described below. Exemplary devices suitable for use as DSP 35 include DSPs having computational power similar to or greater than the TMS320c5x and TMS320c6x DSPs available from Texas Instruments Incorporated. A conventional interface 36 couples DSP 35 to its host HST, which may be a server in the central office context or a workstation on the client side.

Referring back to FIG. 1, transmitting modem 10 receives an input bitstream $w_t$ that is to be transmitted to receiving modem 20. Input bitstream $w_t$ may be generated by a computer at the same location (e.g., the central office) as transmitting modem 10, or alternatively and more likely is generated by a computer network, in the Internet sense, that is coupled to transmitting modem 10. Input bitstream $w_t$ is a serial stream of binary digits, in the appropriate format as produced by the data source.

Input bitstream $w_t$ is received by bit-to-symbol encoder function 11 in transmitting modem 10. Encoder function 11 performs multiple functions in this embodiment. One such function is to group the bits in the input bitstream into multiple-bit symbols, for example ranging up to as many as fifteen bits. The symbols will be the values used to modulate the various subchannels, including both loaded and unloaded subchannels, as will be described below. The symbols typically are not necessarily representative of the transmitted data itself, but instead simply correspond to grouping of the serial bitstream for broadband transmission. The number of bits in each symbol produced by encoder function 11 will vary, in the DSL application, according to the bit loading assigned to each subchannel in the initialization of the communication session, as known in the art. According to this embodiment of the invention, those subchannels that are to receive no payload, i.e. the unloaded subchannels, are also "loaded" with signal values that are specifically selected so that the cyclic prefix can be eliminated or, in other embodiments of this invention, so that its effective length is increased. The operation of encoder function 11 in performing this function will be described in further detail below.

Optionally, error correction coding, such as Reed-Solomon coding for error detection and correction purposes, or trellis coding, may also be applied for additional signal-to-noise ratio improvement.

The symbols generated by encoder function 11 are typically complex symbols, including both amplitude and phase information, and correspond to points in the appropriate modulation constellation (e.g., quadrature amplitude modulation, or QAM) for each subchannel, as determined upon initialization. The encoded symbols for each block, in the form of signal vector $s_t$, including coefficients for both loaded and unloaded subchannels, are then applied to inverse Discrete Fourier Transform (IDFT) function 12. IDFT function 12 associates each input symbol with one subchannel in the transmission frequency band, and generates a corresponding number of time domain symbol samples according to the Fourier transform. These time domain symbol samples, in the form of vector $x_t$ for a given block, are then converted into a serial stream of samples by parallel-to-serial converter 13. Functions 11 through 13 thus convert input bitstream $w_t$ into a serial sequence of symbol values representative of the sum of a number of modulated subchannel carrier frequencies, the modulation indicative of the various data values. Typically, if N/2 complex symbols are presented to IFFT function 12, IFFT function 12 outputs a block of N real-valued time domain samples. Those skilled in the art having reference to this specification will readily recognize that each of functions 11 through 13 may be carried out, and preferably actually are carried out, as digital operations executed by DSP 35 (FIG. 2).

Digital filtering function 15 then processes the datastream. This digital filtering function 15, in combination with analog filtering, incorporates the filtering required to accommodate the large dynamic range and wide frequency bands involved in DSL transmission, as described in U.S. Pat. No. 6,226,322, which is commonly assigned with this application and incorporated herein by reference. Typical digital filtering operations involved in function 15 may include interpolation to increase the sample rate, a digital low pass filter for removing image components, and digital high pass filtering to eliminate POTS-band interference. The digitally-filtered datastream signal is then converted into the analog domain by digital-to-analog converter 16. Analog filtering function 18 is then applied to the output analog signal, prior to its transmission. The filtering performed by function 18 typically includes at least a low-pass pass filter. As described in U.S. Pat. No. 6,226,322, digital filter function 15, digital-to-analog converter 16, and analog filter function 18 are preferably implemented in codec circuit 34 of transmitting modem 10 (FIG. 2).

The output of analog filter 18 is then applied by line driver and receiver circuitry 32 and hybrid circuit 30 (FIG. 2) to transmission channel H, for forwarding to receiving modem 20. According to conventional ADSL technology, the transmission channel consists is physically realized by conventional twisted-pair wire. Transmission channel H adds significant distortion and noise to the transmitted analog signal, reflected by its impulse response h(n), as described above.

The downstream transmitted signal is received by receiving modem 20, which, in general, reverses the processes of transmitting modem 10 to recover the information of input bitstream $w_t$. As shown in FIG. 1, analog filter function 21 processes the received signal prior to analog-to-digital conversion function 22, which converts the filtered analog signal into the digital domain. Conventional digital filtering function 23 is then applied to augment the function of the analog filters. The combination of analog and digital filter functions 21, 23 also preferably includes some frequency band filtering to isolate the received signal from signals currently being transmitted upstream by modem 20.

Time domain equalizer (TEQ) 24 is preferably a finite impulse response (FIR) digital filter, designed to effectively shorten the length of the impulse response of the transmission channel H, taking into account the filtering performed by functions 21, 23. The design of this digital filter is realized by the selection of the particular coefficients of the FIR implementing TEQ function 24 during initialization, or "training", of the combination of modems 10 and 20 as the communications session is established. Serial-to-parallel converter 26 converts the filtered datastream into a number of samples, in the form of vector $y_t$, for application to Discrete Fourier Transform (DFT) function 27. Because the received signal vector $y_t$ is a time-domain superposition of the modulated subchannels, DFT function 27 will recover the modulating symbols at each of the subchannel frequencies, reversing the IDFT performed by function 12 in transmitting modem 10. Each vector $z_t$ that is output by DFT function 27 is a frequency domain representation of a block of transmitted symbols, multiplied by the frequency-domain response of the effective transmission channel. According to this invention, the effective cyclic prefix of the data frame, produced in the manner described below in connection with this embodiment of the invention, is at least as long as the channel response h(t) as shortened by TEQ function 24. Based on this assumption, frequency-domain equalization (FEQ) function 28 divides out the frequency-domain response of the effective channel, and recovers an estimate $$\hat{s}_t^{(L)}$$

of the modulating symbols. Symbol-to-bit decoder function 29 then resequences the recovered symbols, decodes any encoding A that was applied in the transmission of the signal, and produces an output bitstream $\hat{w}_t$ that is an estimate of the input bitstream $w_t$ upon which the transmission was based. This output bitstream $\hat{w}_t$ is then forwarded to a client workstation or other recipient.

The theory of operation of the preferred embodiment of the invention will now be described, following which its implementation into encoding function 11 in modem 10, as a sequence of program instructions executable by DSP 35, will then be described.

Figure 3:
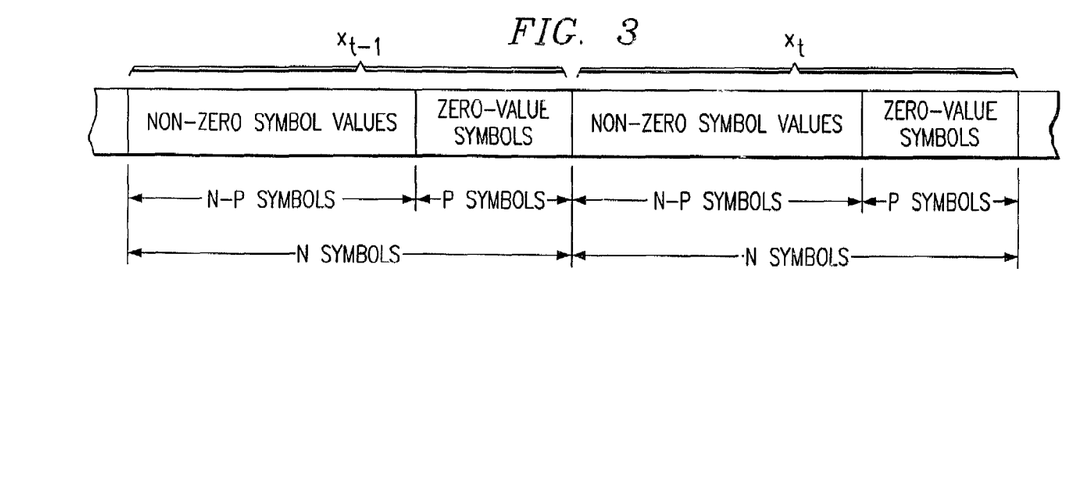
FIG. 3 is a diagram illustrating the relationship of contiguous frames of communicated data according to the first preferred embodiment of the invention.

According to this first embodiment of the invention, each frame of symbols that are modulated by IDFT function 12 are encoded, by encoding function 11, so that the samples in a trailing portion of the discrete time domain signal from parallel-to-serial converter 13 have a known value, preferably zero. FIG. 3 illustrates a sequence of frames that are encoded and modulated in this manner.

Each of the frames, including frame (vector) $x_t$ in FIG. 3, is arranged as N samples of a discrete digital signal. Referring to frame $x_t$ by way of example, the first N–P samples have non-zero values, with the sample values communicating the signal data being transmitted. To clarify, some samples in this first portion of the frame may in fact be zero valued by virtue of the data being communicated, but these samples are not forced to zero for purposes of this invention. The term "non-zero-valued", for purposes of this description, should be understood to refer to samples that are permitted, but not required, to have non-zero values. The trailing portion of frame $x_t$, which are the last P samples in the frame, are forced to have zero values according to this embodiment of the invention. As will be described in detail below, the forcing of the last P samples to a zero value also determines the specific values of the N–P non-zero values in the first portion of frame $x_t$ containing non-zero-valued samples.

As evident from FIG. 3, preceding frame $x_t$, similarly has a trailing portion of P zero-valued samples. The other frames in the datastream are similarly derived. Looking specifically to frame $x_t$, by way of example, the P zero valued samples in its trailing portion are exactly identical to the P zero-valued samples in the trailing portion of preceding frame $x_{t-1}$. In effect, the trailing portion of preceding frame $x_{t-1}$, because its samples are forced to the same value (e.g., zero) as the trailing portion of current frame $x_t$, serves the same purpose as would a cyclic prefix formed by the prepending of the last P samples of frame $x_t$. However, these identical samples are contained within the previous frame $x_{t-1}$, and do not require replicating and prepending a portion of frame $x_t$ itself. The benefits of a cyclic prefix are thus attained, according to this preferred embodiment of the invention, but with no data rate loss because the data redundancy is not located in the time domain signal, but instead is based upon redundancy in the frequency-domain. All N samples of each frame, including the zero-valued trailing portion, are included in the demodulating DFT at the receiver.

According to this first embodiment of the invention, the values of the non-zero-valued first portion of each frame are determined by including unloaded channels in the encoding and IDFT processes 11, 12, and according to the constraint that the trailing portion samples are forced to zero values. The theory of this derivation will now be described, for the case of a block length of N samples, where P is the number of unloaded subchannels and thus the number of zero-valued samples in the trailing portion of the block, and where the channel length (i.e., impulse response of transmission channel H) is L samples. The number of bit-loaded subchannels is therefore N–P.

Consider a vector $s_t^{(L)}=[s_t^{(L)}(0), \ldots, s_t^{(L)}(N-1)]^T$ as representing the data on the N–P loaded subchannels with zero values on the remaining P subchannels. If the unloaded subchannels have indices $u_0, \ldots, u_{P-1}$, then vector elements $s_t^{(L)}(n)=0$ for $n=u_0, \ldots, u_{P-1}$. This vector $s_t^{(L)}$ thus corresponds to the data vector that is conventionally applied to IDFT function 12, where the P unloaded channels are set to zero (because they are unloaded).

Vector $s_t^{(U)}=[s_t^{(U)}(u_0), \ldots, s_t^{(U)}(u_{P-1})]^T$ can be defined to be the vector of the unloaded subchannels. According to this embodiment of the invention, each element $s_t(n)$ of vector $s_t$, to be applied to IDFT modulation function 12, can be derived as:

$$s_t(n) = \begin{cases} s_t^{(U)}(n), & n \in \{u_0, \ldots, u_{P-1}\} \\ s_t^{(L)}(n), & \text{otherwise} \end{cases}$$

IDFT modulation function 12 applies an N×N IDFT matrix $Q^H$ to vector $s_t(n)$ to form the modulated time-domain signal $x_t=[x_t(0), \ldots, x_t(N-1)]^T$:

$$x_t=Q^H s_t$$

This time-domain signal vector $x_t$ is intended to have a trailing portion with P zero-valued samples, as shown in FIG. 3.

According to this first preferred embodiment of the inventions, the signals $s_t^{(U)}(u_0), \ldots, s_t^{(U)}(u_{P-1})$ that are applied to the unloaded subchannels prior to IDFT function 12 are chosen so that the last P samples of the time-domain signal $x_t$ are zero-valued. These unloaded subchannel signals $s_t^{(U)}(n)$, for $n=u_0, \ldots, u_{P-1}$, are computed from and depend upon the loaded subchannel signals $s_t^{(L)}(n)$ in the same block or frame. This definition of the subchannel signals to arrive at the desired trailing zero-valued portion necessarily requires consideration of the IDFT operation.

One can consider the IDFT of signal $s_t(n)$ as:

$$x_t(n) = \frac{1}{\sqrt{N}} \sum_{k=0}^{N-1} S_t(k) e^{j\frac{2\pi}{N}kn}$$

$$= \frac{1}{\sqrt{N}} \sum_{k=0}^{N-1} s_t^{(L)}(k) e^{j\frac{2\pi}{N}kn} + \frac{1}{\sqrt{N}} \sum_{k \in \{u_0, \ldots, u_{P-1}\}} s_t^{(U)}(k) e^{j\frac{2\pi}{N}kn}$$

$$= x_t^{(L)}(n) + \frac{1}{\sqrt{N}} \left[ e^{j\frac{2\pi}{N}u_0 n}, \ldots, e^{j\frac{2\pi}{N}u_{P-1} n} \right] s_t^{(U)}$$

$$= 0, \quad n = N-P, \ldots, N-1$$

where $x_t^{(L)}(n)$ takes the obvious definition. By defining $x_t^{(L)} = [x_t^{(L)}(0), \ldots, x_{t(L)}(N-1)]^T$ and collecting like terms, one can rewrite the vector as:

$$x_t^{(L)}(N-P:N-1) = \frac{1}{\sqrt{N}} \begin{bmatrix} e^{j\frac{2\pi}{N}u_0(N-P)} & \cdots & e^{j\frac{2\pi}{N}u_{P-1}(N-P)} \\ \vdots & & \vdots \\ e^{j\frac{2\pi}{N}u_0(N-1)} & \cdots & e^{j\frac{2\pi}{N}u_{P-1}(N-P)} \end{bmatrix} s_t^{(U)}$$

or:

$$= A s_t^{(U)}$$

where transformation matrix A has the appropriate P×P definition. One can then recover the unloaded subchannel vector $s_t^{(U)}$ from:

$$s_t^{(U)} = A^{-1} x_t^{(L)}(N-P:N-1)$$

so long as transformation matrix A is full rank. Because transformation matrix A depends only on the set of unloaded subchannels, and on the parameters N and P, transformation matrix A and its inverse are not dependent on the signal and need only be calculated once for each communications session, as will become apparent from the following description.

In short, according to the preferred embodiment of the invention, a signal vector $s_t^{(U)}$ is produced, and applied to the set of P unloaded subchannels $u_0$ through $u_{P-1}$, so that the last P time-domain samples from the IDFT of the signal are zero-valued. This unloaded subchannel signal $s_t^{(U)}$ can be determined from an encoded signal $s_t^{(L)}$ for the loaded subchannels that is based on the input signal, and by performing a matrix operation between a precalculated transformation matrix $A^{-1}$ and a time-domain signal corresponding to this signal, to produce the unloaded subhchannel signal $s_t^{(U)}$ that forces the P trailing samples to zero.

Figure 4:
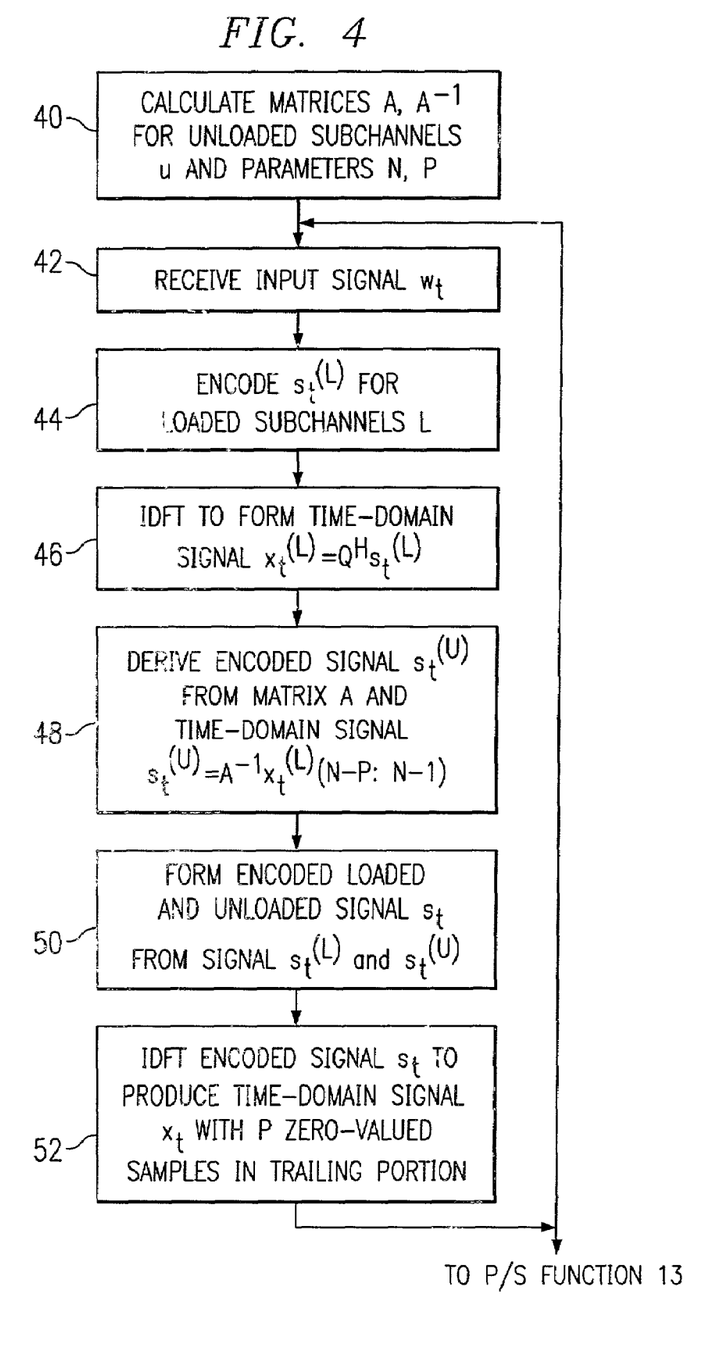
FIG. 4 is a flow diagram illustrating the operation of the bit to symbol encoder function of the transceiver of the first preferred embodiment of the invention.

Referring now to FIG. 4, the operation of bit-to-symbol encoder function 11 according to this first preferred embodiment of the invention will now be described in detail. Preferably, the operation of encoder function 11 is performed by DSP 35 executing a corresponding sequence of program instructions. Alternatively, of course, custom or semi-custom logic may be used to execute this function.

Prior to the initiation of encoder function 11 for any frame of data, certain parameters are known for the particular modem to modem communication. These parameters include the frame size N (i.e., the size of the IDFT and DFT functions), the number P of unloaded subchannels and which subchannels are those that are unloaded. These parameters are determined either a priori or during initialization of the communication. For example, as well known in the art, each DSL session includes an initialization routine by way of which each subchannel is bit-loaded according to the noise and attenuation present for that particular subchannel's frequencies. Once this information is known, DSP 35 carries out process 40 by way of which the transformation matrix A or its inverse $A^{-1}$ is determined for the unloaded subchannels from:

$$A = \begin{bmatrix} e^{j\frac{2\pi}{N}u_0(N-P)} & \cdots & e^{j\frac{2\pi}{N}u_{P-1}(N-P)} \\ \vdots & & \vdots \\ e^{j\frac{2\pi}{N}u_0(N-1)} & \cdots & e^{j\frac{2\pi}{N}u_{P-1}(N-P)} \end{bmatrix}$$

This process 40, and the resulting matrices A, $A^{-1}$ need only be calculated once for each DSL session.

In process 42, encoder function 11 receives input signal x(t), which is a serial discrete time-domain signal to be transmitted over the various subchannels. The samples of input signal $w_t$ are arranged into frames of N symbols, with N being the size of the IDFT and DFT transforms. These discrete samples $w_t$ are encoded, in process 44, into the appropriate vector $s_t^{(L)} = [s_t^{(L)}(0), \ldots, s_t^{(L)}(N-1)]^T$, to represent the input signal $w_t$ on the N−P loaded subchannels, assuming zeroes for the P unloaded subchannels. Of course, this vector $s_t^{(L)}$ will not provide a trailing portion of zero-valued samples after inverse DFT. Rather, vector $s_t^{(L)}$ corresponds to the set of symbols that is conventionally transformed into the time domain by IDFT, and for which a cyclic prefix is necessary according to conventional techniques.

In process 46 according to this first preferred embodiment of the invention, an inverse discrete Fourier transform IDFT is performed on vector $s_t^{(L)}$ using the N×N IDFT matrix $Q^H$ that is otherwise used in IDFT process 12. The result of process 46 is a time-domain signal $x_t^{(L)}$ for the N time-domain samples of the block to be transmitted. However, in this signal $x_t^{(L)}$, the trailing portion of P samples are not necessarily zero-valued. According to this embodiment of the invention, a signal $s_t^{(U)}$ is generated for application to the unloaded subchannels that will force this trailing portion to zero.

In process 48, the trailing P samples (N−P:N−1) of time domain signal $x_t^{(L)}$ is applied to transformation matrix $A_{-1}$ to produce the signal $s_t^{(U)}$ for the unloaded subchannels. As described above, the coefficients of transformation matrix $A^{-1}$ are defined according to the constraint of zero values for samples (N−P:N−1). The matrix operation performed by DSP 35, in this embodiment of the invention, in executing process 48 is:

$$s_t^{(U)} = A^{-1} x_t^{(L)}(N-P:N-1)$$

Accordingly, the result of process 48 is the set of symbols to be applied to the unloaded subchannels. Process 50 then combines the loaded subchannel vector $s_t^{(L)}$ that is derived from the input signal $w_t$, with the unloaded subchannel vector $s_t^{(U)}$ determined in process 48 to result in P zero-valued samples at the trailing portion of each block of the time-domain IDFT output.

This combined encoded signal $s_t$ is then applied to IDFT function 12, which performs process 52 (FIG. 4) to produce a time-domain discrete signal $x_t$ of frame length N, and that has P trailing zero-valued samples. The operation of process 52 again uses IDFT matrix $Q^H$, performing the operation $x_t = Q^H s_t$. This time-domain signal $x_t$ is forwarded to parallel/serial conversion function 13 (FIG. 1) for conversion into a bitstream for eventual transmission over the communications channel H. As evident from FIG. 1, however, because of the P trailing zero-valued samples in signal $x_t$, no cyclic prefix need be applied prior to transmission, in order for the receiver to fully recover signal $w_t$.

Following completion of process 52, the next frame of input signal $w_t$ can be received and encoded by encoding function 11, with the process of FIG. 4 repeating for this next frame from process 42. As noted above, the same coefficients of matrices A, $A^{-1}$ may be used for this next frame of signal $w_t$, and upon all frames of signal $w_t$ for this DSL communication, or at least until the bit loading or frame size is changed.

Referring back to FIG. 1, time domain signal $x_t$ is filtered by filter 15, converted to analog by DAC 16, again filtered by filter 18, and then transmitted over communications channel H to receiving modem 20. Receiving modem 20 performs the analog filtering via filter 21, conversion to digital by ADC 22, and digital filtering via filter 24. Time-domain equalizer function 24 applies an appropriate digital function to effectively reduce the length of the impulse response of transmission channel H, preferably to a length less than the P zero-valued samples in the trailing portion of the received frame.

According to this embodiment of the invention, the demodulation and equalization that is performed at receiving modem 20 to recover the original signal is effectively identical to that performed in conventional DMT systems, with the exception that there is no cyclic prefix removal function because no cyclic prefix is prepended to each block. Referring back to FIG. 1, analog filter function 21 is applied to the incoming analog time-domain signal in the conventional manner, as is digital filter function 23 following conversion of the analog signal to digital by A/D converter 22. Conventional time-domain equalization function 24 is applied to the filtered discrete digital datastream, to effectively reduce the length of the impulse response of transmission channel H. As known in the art, digital filter function 23 and TEQ function 24 is preferably performed by a digital signal processor (e.g., DSP 35 of FIG. 2) executing the appropriate program instructions to carry out these operations. The datastream is then converted into blocks of parallel symbols, arranged according to the subchannels in the transmission, by serial-to-parallel function 26.

The signal at this point may be considered as vector $y_t = [y_t(0), y_t(1), \ldots y_t(N-1)]^T$. Consider filtering matrix $H_f$:

$$H_f = T(h_f, N)$$

where T is the Toeplitz filtering matrix, applied in this case to the subchannel impulse response vector $h_f$. Under the assumption that transmission channel H added no noise to the transmitted signal, the channel output signal vector $y_t$ can be expressed:

$$y_t = H_f \begin{bmatrix} x_{t-1}(N-P:N-1) \\ x_t \end{bmatrix}$$

According to this embodiment of the invention, the last P samples of both of transmitted signal blocks $x_t$ and $x_{t-1}$ are zero-valued:

$$x_t(n) = x_{t-1}(n) = 0, \ n = N-P, \ldots N-1$$

This can be used to eliminate unnecessary entries in the Toeplitz filtering matrix, for example by using an N×N circular matrix $H_c = C(h_c, 0)$, so that input vector $y_t$ may be expressed:

$$y_t = H_c x_t$$

Discrete Fourier transform (DFT) function 27 demodulates the symbols into a vector $z_t$ of time-domain sample values, using the N×N DFT matrix Q:

$$z_t = Q y_t$$
$$= Q H_c Q^H s_t$$

DFT function 27 thus produces demodulated signal vector $z_t$ in the frequency domain from the received filtered discrete time domain signal vector $y_t$.

Recovery of the encoded signal $s_t$ from demodulated signal vector $z_t$ may be performed, according to this embodiment of the invention, by frequency domain equalizer (FEQ) function 28. This recovery is enabled by the repeating group of P zero-valued symbols in each frame, which provide the same effect as a cyclic prefix, so long as the channel length is shorter than P samples.

One can see from the above derivation that circular matrix $H_c$ is diagonalized by the IDFT/DFT pair Q, $Q^H$, enabling the definition of element (n, n) of this resulting diagonal matrix to be expressed as:

$$H(n) = (Q H_c Q^H)_{nn}$$

FEQ function 28 can be defined as the application of a diagonal matrix G to demodulated signal $z_t$ to retrieve an estimate $$\hat{s}_t^{(L)}.$$

Considering the above expression for elements H(n) of the channel response, diagonal FEQ matrix G may be defined as:

$$G(n, n) = \begin{cases} 0, & n \in \{u_0 \ldots, u_{P-1}\} \\ 1/H_n & \text{otherwise} \end{cases}$$

This matrix G thus zeroes out the values associated with the unused channels $u_0, u_1, \ldots u_{P-1}$. FEQ function 27 is thus carried out to produce estimate $\hat{s}_t^{(L)}$.

as follows:

$$\hat{s}_t^{(L)} = Gz_t$$
$$= s_t^{(L)}$$

which are the encoded symbol values on the L loaded subchannels. These signals are then decoded, by symbol-to-bit function 29, into an estimate $\hat{w}_t$ of the input bitstream $w_t$.

These operations in receiving modem 20 are, as discussed above, conventional for the demodulation of DMT signals, except for the removal of the cyclic prefix, which is required according to conventional techniques but not according to this embodiment of the invention. With this exception, conventional modems are fully capable of receiving and demodulating signals transmitted according to this embodiment of the invention, with little if any change to their operational code and instructions. According to this embodiment of the invention, the FEQ function can be kept relatively simple so that the original signal is faithfully recovered, but without the loss of effective data rate that results from the conventional time-domain data redundancy of the cyclic prefix. Instead, according to this embodiment of the invention, the redundancy is placed in the frequency domain, specifically at those subchannels that are otherwise unloaded due to noise problems or otherwise, so that no data rate loss is incurred.

It is contemplated that various alternative embodiments of this invention will similarly provide important benefits in the modulation of DMT signals, particularly by providing the benefits of a cyclic prefix without the accompanying loss in data rate. As noted in the first preferred embodiment of the invention, the number P of zero-valued valued samples in the trailing portion of each frame was equal to the number of unloaded subchannels. Alternative embodiments of this invention use more or fewer subchannels than the number of zero-valued samples, producing either underdetermined or overdetermined systems of equations in the IDFT operation.

According to one alternative embodiment of the invention, the number R of unloaded subchannels is greater than the number P of zero-valued entries in the trailing portion of each transmitted block. This underdetermined system permits one or more additional constraints to be included in the encoding of the unloaded subchannels. As a result, not only is the cyclic prefix avoided by the defined trailing portion of the block, but other beneficial conditions can also be achieved, also without loss of data rate. These other conditions include minimization of the power of the signals applied to the unloaded subchannels to permit maximizing the power on the loaded subchannels, reduction in the peak to average ratio (PAR) of the transmission to limit the dynamic range requirements at the receiver, and the like. For R unloaded subchannels, one may consider the transmitted signal vector $x_t^{(L)}$ on the loaded subchannels as:

$$x_t^{(L)}(N-P:N-1)=As_t^{(U)}$$

where $s_t^{(U)}$ is the vector (of size R×1) of unloaded subchannels, as before. Transformation matrix A in this case is a P×R matrix. If one were to resolve this underdetermined system by setting R−P entries of vector $s_t^{(U)}$ to have zero values, an equivalent set of equations to the R=P case discussed above would result However, according to this preferred alternative embodiment of the invention, a cost function can be derived to insert a secondary constraint such as minimum unloaded subchannel power or minimized PAR into the derivation of the system. For example, cost function $J(s_t^{(U)})$ can be defined to minimize the power on the R unloaded subchannels:

$$J(s_t^{(U)}) = \frac{1}{2}s_t^{(U),T}s_t^{(U)} + \lambda^T(As_t^{(U)} - x_t^{(L)}(N-P:N-1))$$

where λ is the P×1 Lagrange multiplier. Minimizing cost function $J(s_t^{(U)})$ with respect to vector $s_t^{(U)}$ results in:

$$s_t^{(U)}=A^T(AA^T)^{-1}x_t^{(L)}(N-P:N-1)$$

One can readily show that, for the case where R=P, this minimization reduces to the solution:

$$s_t^{(U)}=A^{-1}x_t^{(L)}(N-P:N-1)$$

discussed above.

According to this alternative embodiment of the invention, therefore, the transformation matrix A derived by encoding function 11 in process 40 (FIG. 4) is determined for the R unloaded subchannels from:

$$A = \begin{bmatrix} e^{j\frac{2\pi}{N}u_0(N-P)} & \cdots & e^{j\frac{2\pi}{N}u_{R-1}(N-P)} \\ \vdots & & \vdots \\ e^{j\frac{2\pi}{N}u_0(N-1)} & \cdots & e^{j\frac{2\pi}{N}u_{R-1}(N-P)} \end{bmatrix}$$

to derive the appropriate P×R transformation matrix A. As in the previously described preferred embodiment of the invention, process 40 need only be performed once in each communications session, because its terms depend only upon the defined sets of loaded and unloaded subchannels, and the number P of zero-valued samples to be included within each data block.

Conversely, an overdetermined system may be used where the number R of unloaded subchannels is less than the number P of zero-valued samples in the trailing portion of each block. In this alternative embodiment of the invention, perfect equalization may not be accomplished, but it is still contemplated that some of the less-loaded subchannels may be utilized to provide the trailing zero-valued samples. Alternatively, especially in this overdetermined case, only the real or imaginary component of one or more subchannels may be used for redundancy, if the coding applied in function 11 is compatible with such splitting.

Further in the alternative, it is contemplated that values other than zero may be applied in the trailing portion of each data block, so long as the trailing portion of each data block is identical among the blocks to provide the effect of a cyclic prefix. For example, some systems use multiple fixed pilots within each DMT symbol. In this type of system, the trailing portion of each data block could be composed from a time-domain version of these multiple pilots, plus the time-domain version of the remainder of the frequency-domain data. According to this example, the frequency-domain redundancy of this invention is used to form the time-domain pilot equivalent in the trailing samples, which is expected to reduce the power of the transmission.

Other non-zero-valued trailing portion samples may alternatively be used to provide additional benefits. The increasing popularity and deployment of DSL (and wireless) services has increased the extent of crosstalk among channels. Previously, the problem of crosstalk was addressed by various known algorithms for estimating the crosstalk "channel" so that it can be eliminated by filtering. According to this invention, however, it is contemplated that frequency-domain redundancy can be used in the crosstalk estimation procedures. Further in the alternative, it is contemplated that some systems may assign a unique signature to each user, associated with the receiving modem on initialization. If the signature length is equated to the number of samples in the non-zero-valued trailing portion, the transmitting modem can generate signatures for each subscriber by way of the frequency-redundancy approach of this embodiment of the invention, in which case each subscriber can estimate crosstalk from those blocks that have signatures other than its own. In each of these and other alternative applications, the trailing portion of each block will serve as a prefix for the next block in the signal sequence, ensuring recovery of the signal without data rate loss.

Each of these embodiments of the invention, whether the repeating trailing portion is zero-valued or non-zero-valued, utilizes frequency domain redundancy by assigning frequency domain signal values to unloaded subchannels to produce a desired trailing portion of the time domain signal. The ability to choose those subchannels that are to be used in frequency domain redundancy is an important factor in attaining the benefits of this invention.

For example, consider an extremely noisy or attenuated communications system in which approximately one-half of the subchannels are unusable for data transmission because of poor signal-to-noise ratio, whether due to noise or to signal attenuation. According to this invention, these subchannels are available for generating the trailing portion of each time domain block, for example as zero-valued samples. In this example, the effect of an extremely long cyclic prefix is provided with no loss of data; according to conventional techniques, if a cyclic prefix of equivalent length were used, the data rate would be cut in half. This extreme example is indicative of the value of the frequency-domain redundancy approach of this invention.

On the other hand, the block and transform sizes are fixed in typical DMT systems, to simplify hardware implementation and to limit system delay for real-time applications such as voice, video conferencing, and online gaming. The selection of these block sizes and cyclic prefix lengths is based on typical channel performance over conventional facilities. For example, conventional ADSL systems use a block size of 544 samples, made up of a cyclic prefix of 32 samples and a transform (IDFT/DFT) size of 512 samples. In this conventional fixed arrangement, however, it has been observed that the available bandwidth over many communications sessions often greatly exceeds the usable bandwidth. Typically, the upper half of DSL subchannels are unloaded beyond 15000 feet over 26 AWG twisted pair wire facilities, with −140 dBm/Hz additive white Gaussian noise (AWGN), and the channel length is typically much longer than the 32 sample cyclic prefix. According to this invention, these unused upper half subchannels become available to form transmit blocks with a large number of trailing zeroes, hopefully longer than the impulse response of the transmission channel. It is contemplated that this use of frequency-domain redundancy will greatly reduce equalizer requirements in many receiving devices, considering that the long channel length has required conventional receivers to include a time domain equalizer to reduce the effective channel length and to implement additional complexity in the frequency-domain equalizer. Theoretically, widespread adoption of the frequency domain redundancy according to this invention could eventually permit the design and implementation of receiving modems with relatively simple and inexpensive equalizer functions.

The effect of frequency-domain redundancy according to this invention on the complexity of receiver equalization enables a system having a high level of receiver equalization capability to conversely reduce the frequency-domain redundancy applied by the transmitter. In this way, it is contemplated that the balance between frequency-domain redundancy and receiver equalization can be adaptively adjusted, with the amount of frequency domain redundancy selectable for each session based upon the equalization capability of the receiver. This setting and adjustment of the frequency-domain redundancy and receiver equalization can be effected upon initialization of a communications session during modem "training", and also within the communications session itself during normal operation.

In the training context, the central office modem and the modem in the client premises equipment (CPE) communicate with one another to establish and select the unloaded subchannels and the number of trailing zeroes to be produced. Referring to the system of FIG. 1, for the example of downstream communications in which transmitting modem 10 is at the central office and receiving modem 20, modem 10 identifies one or more sets of candidate unloaded subchannels during session training. According to this implementation, each set is associated with a number of trailing zeroes, or sequence length if non-zero valued samples are to be used, that can be supported by that set of unloaded subchannels. Modem 10 then communicates those sets to receiving modem 20, along with the corresponding number of trailing zeroes or the known sequence length associated with each set. Modem 20 then selects the desired set of unloaded subchannels, according to its equalization capabilities, and communicates this selection to modem 10. The selected set of unloaded subchannels is then used by transmitting modem 10, and its associated sequence length (zero or non-zero) in performing its frequency-domain redundancy. After training is complete, and during normal operation, modem 20 may also be permitted to select a different one of the candidate sets of unloaded subchannels and communicate this selection to modem 10, so that the frequency domain redundancy performed by transmitting modem 10 may be adjusted if conditions change during the communications session.

Alternatively, a less restrictive approach may be used to balance and optimize transmitter frequency domain redundancy versus receiver equalization capability. In this example, again referring to transmitting modem 10 as being in the central office and receiving modem 20 as included in the CPE, modem 10 communicates a range of the number of candidate unloaded subchannels and a number of trailing zeroes or known sequence length, to modem 20, during the training operation for downstream communications. Modem 20 then builds a selected set of subchannels, and the number of trailing zeroes, to be used in communications, based on its equalization capabilities and on the transmission channel response, and communicates its selection to modem 10 at the central office. Modem 10 then uses the unloaded subchannels and trailing zero length determined by receiving modem 20 in its frequency-domain redundancy. Also according to this alternative approach, during normal operation of the communications sessions, modem 20 in the CPE may derive a set of different unloaded subchannels, or a different number of trailing zeroes (or sequence length for non-zero values), and communicate this new selection to modem 10, following which transmitting modem 10 will encode the frequency-domain redundant information on the newly selected unloaded subchannels to the extent of the samples selected by modem 20.

Further in the alternative, if modem 20 in the CPE also includes frequency-domain redundancy capability, the training operation may also include selection of the unloaded upstream subchannels, and the selection of the number of trailing zeroes or sequence length, by modem 10 at the central office. These selections can then be used to reduce or eliminate the need for the cyclic prefix for upstream transmissions, and may be adjusted during the communications session by modem 10 in a similar manner as described above.

Baseband DMT systems for ADSL communications, as described in Palm, ed., "G.dmt: asymmetrical digital subscriber line (ADSL) transceivers", ITU-T Study Group 15 Question 4, G.992.1, 1999, are designed according to the constraint that:

$$s_t(N-n) = s_t^*(n), n = \frac{N}{2}+1, \ldots, N-1$$

which produces a signal vector $x_t$ having only real values. According to the preferred embodiment of this invention, this additional constraint on signal vector $x_t$ can be accommodated in the formation of transformation matrix A and in solving for signal vector $s_t^{(U)}$, by splitting both transformation matrix A and signal vector $s_t^{(U)}$ into real and imaginary components, and solving the sets of real and imaginary components independently. The unloaded subchannels in this baseband DMT implementation includes the DC and Nyquist frequency subchannels: $s_t^{(0)} = s_t(N/2) = 0$.

In any of these implementations, one should comprehend that the choice of the subchannels to be used for frequency-domain redundancy does affect the condition number of transformation matrix A. For example, selection of the last P subchannels to be unloaded and carry the redundant signal results in a significantly poorer condition number for transformation matrix A than would the spreading out of the unloaded subchannels over the bandwidth. The selection of unloaded subchannels is therefore preferably not done in an arbitrary manner. Indeed, there may be a tradeoff between the selection of subchannels with small capacity to be used for frequency-domain redundancy, minimizing data loss, and subchannels that would provide a good condition number for transformation matrix A, for computational efficiency.

According to still more alternative embodiments of the invention, frequency-domain redundancy according to this invention may be used not to fully replace the cyclic prefix, but rather in combination with a cyclic prefix to augment its effect in eliminating ISI and in ensuring accurate recovery of the transmitted signal. In these alternative embodiments of the invention, each block includes N+P samples, where the cyclic prefix is P samples long. According to these alternative embodiments of the invention, the number of zero-valued trailing samples may be less than the length of the cyclic prefix, or alternatively the number of zero-valued trailing samples may be either equal to or greater than the cyclic prefix length. In either case, the zero-valued samples are added by way of frequency domain redundancy to permit high fidelity signal recovery.

In the case with fewer zero-valued samples than the cyclic prefix length, consider the time-domain channel input vector as $x_t = [x_t(0), \ldots, x_t(N+P-1)]^T$, where:

$$x_t(P:N+P-1) = Q^H s_t$$

and where:

$$x_t(n) = x_t(n+N), n = 0, \ldots, P-1$$

because of the presence of the P sample cyclic prefix. According to this embodiment of the invention, frequency domain redundancy is added to signal vector $s_t$ in the form of Z zero-valued samples so that:

$$x_t(n) = 0, n = N - \frac{Z}{2}, \ldots, N-1, N+P-\frac{Z}{2}, \ldots, N+P-1$$

As evident from this representation, one half of the Z zero-valued samples appear at the terminal portion of the N data sample block, and the other half of the Z zero-valued samples appear at the terminal end of the cyclic prefix itself. The corresponding signal in the frequency domain applied to the unloaded subchannels is derived in the same manner as described above relative to FIG. 4. Representing the N×N circular transmission channel matrix $H_0 = C(h_c, 0)$ and the transmission channel output $y_t = [y_t(0), \ldots y_t(N+P-1)]$, for a channel length L=P+Z/2+1, the input/output relationship for the channel can be expressed as:

$$y_t(P:N+P-1) = H_0 x_t(P:N+P-11)$$

This relationship is identical to that of a conventional DMT system including a cyclic prefix of P samples. Transmission channel matrix $H_0$ is diagonalized by the IDFT/DFT matrices that are used for modulation and demodulation. From this relationship, the input signal $x_t$ can be recovered with a conventional frequency domain equalizer.

Figure 5:
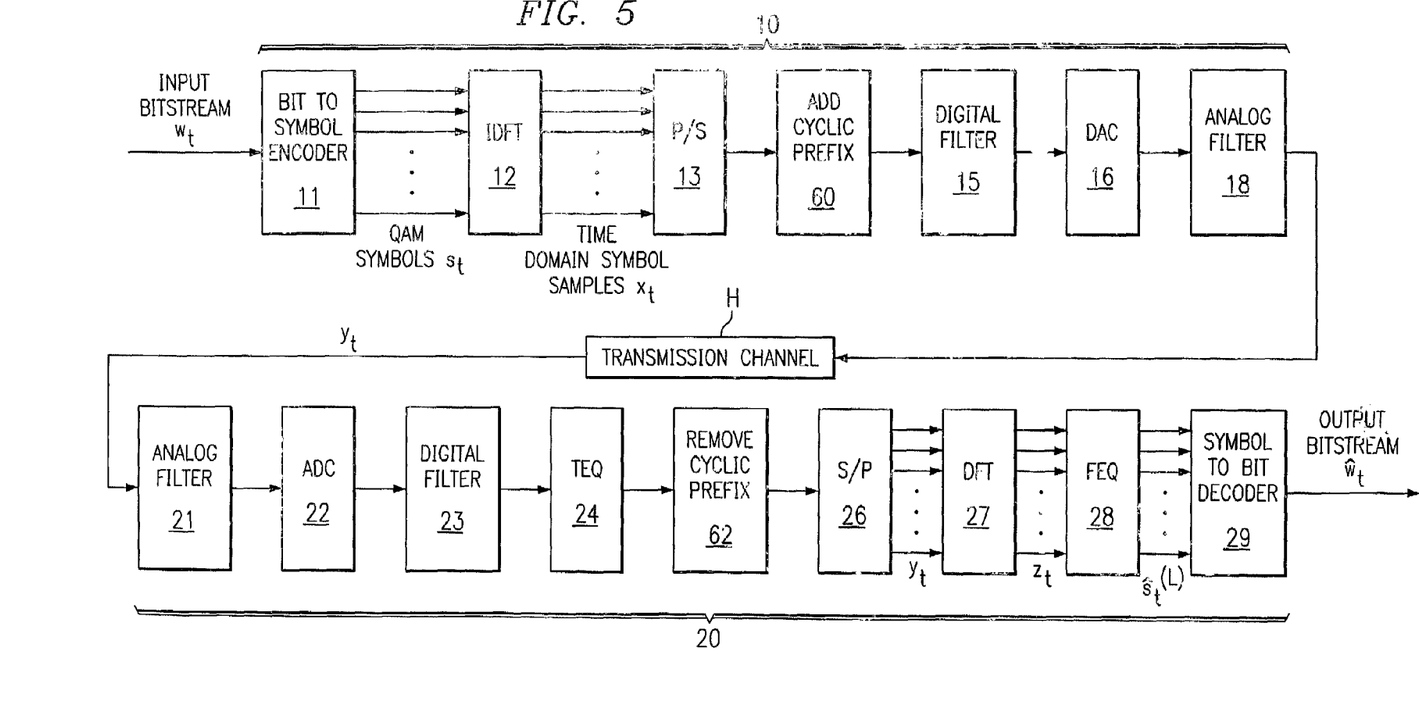
FIG. 5 is a functional block diagram of communications between two DMT transceivers, where at least the transmitting transceiver is constructed according to alternative embodiments of the invention that use a cyclic prefix.

Referring now to FIG. 5, the transmission and receipt of data blocks according to this embodiment of the invention will be described. In the functional flow diagram of FIG. 5, similar functions are referred to by the same reference numerals as in FIG. 1. Also as before, the digital functions in the flow diagram of FIG. 5 are preferably performed by a digital signal processor executing a sequence of program instructions; of course, other hardware and software realizations of these functions may alternatively be used.

As shown in FIG. 5, input bitstream $w_t$ is encoded by bit to symbol encoder function 11 to produce QAM symbols $s_t$. The operations for performing such encoding are similar to those described above relative to FIG. 4, except that the unloaded subchannels are selected and encoded to produce Z zero-valued samples at trailing portions of the data block of N samples. This encoded symbol vector $s_t$ is transformed into the time domain by IDFT function 12, which performs an N×N IDFT transform to generate signal vector $x_t$. After conversion of signal vector $x_t$ into a serial datastream by parallel-to-serial converter function 13, a P sample cyclic prefix is added in function 60 according to this embodiment of the invention. In this example, the P samples include Z/2 zero-valued samples at the trailing end of the N sample data block that were produced by encoding function 11. This cyclic prefix is prepended to the N sample data block in function 60, following the conventional manner in which cyclic prefixes are added to DMT signals. The signal is then transmitted over communications channel H, following digital filter function 15, D/A conversion 16, and analog filtering 17.

At receiving modem 20, analog filter function 21, A/D conversion 22, and digital filter 23 are applied to the received signal. Time domain equalizer function 24 reduces the effective transmission channel impulse response, if desired. The cyclic prefix added by transmission function 60 is then removed by function 62 of receiving modem 20. Specifically, the leading P samples of the data frame are simply discarded. The demodulation of the received signal (functions 26, 27, 28), and decoding (function 29) are then applied in the manner described above, with those unloaded subchannels simply having their signal contribution ignored (i.e., assumed to be zero-valued).

According to this embodiment of the invention, therefore, both frequency-domain redundancy and a cyclic prefix are used in generation of the transmitted signal. The frequency-domain redundancy provides an effective cyclic prefix that is longer than the P samples, specifically by Z/2. However, as described above, this additional cyclic prefix length is achieved without any additional loss of data rate beyond the P samples already used in the cyclic prefix, because the frequency-domain signals used to generate these zero-valued time domain samples reside only in unloaded subchannels. In addition, because receiving modem 20 need not be specially constructed to not perform the cyclic prefix removal function 62, the application of frequency-domain redundancy in the transmitted signal is transparent to receiving modem 20. It is contemplated that the additional cyclic prefix length of Z/2 samples will enable improved equalization at receiving modem 20, even for relatively long transmission channel impulse responses.

According to yet another alternative embodiment of the invention, the number Z of zero-valued samples may be equal to or greater than the length P of the cyclic prefix. The generation of the encoded and transformed signal for transmission in this case may be performed identically as described above relative to FIG. 5. The cyclic prefix will again be lengthened by Z/2 samples, as before, and receiving modem 20 can operate in the conventional DMT manner by removing the cyclic prefix in its process 62.

In this case of the number Z of zero-valued samples being equal to or greater than the cyclic prefix length P, rearrangement of these samples may be performed to even further lengthen the cyclic prefix to Z+P+1, as will now be described. In this additional alternative embodiment of the invention, referring again to FIG. 5, encoding process 11 generates Z zero-valued samples at the trailing portion of the block of N samples, following the procedure described above relative to FIG. 4. This block of N samples is then transformed into the time domain by IDFT function 12, and converted to a serial data stream by function 13.

According to this alternative embodiment of the invention, however, signal vector $x_t$ is derived so that:

$$x_t(n)=0, n=N+P-Z, \ldots, N+P-1$$

Figure 6:
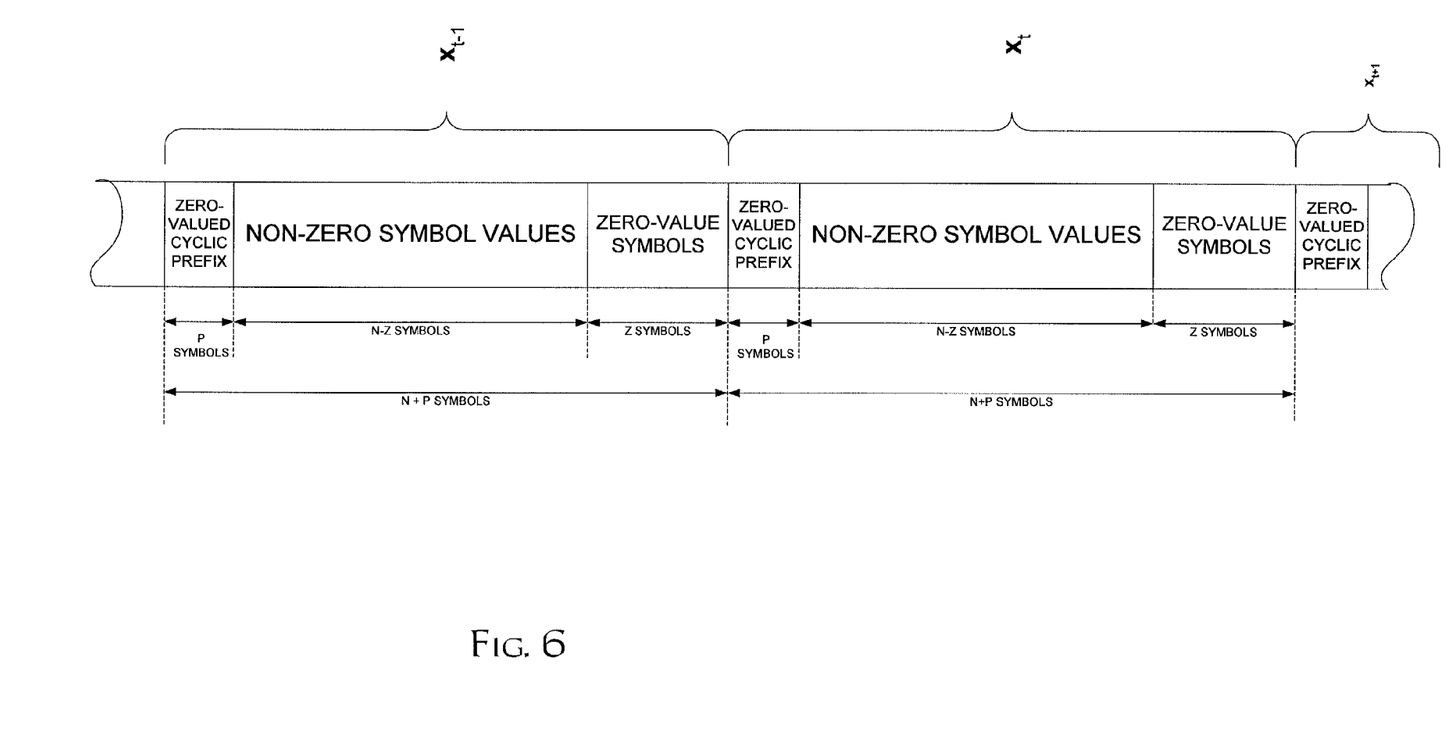
FIG. 6 is a diagram illustrating the relationship of contiguous frames of communicated data according to an alternative preferred embodiment of the invention.

After addition of the P sample cyclic prefix in process 60, the first P samples of the N+P sample block will be zero-valued:

$$x_t(n)=0, n=0, \ldots, P-1$$

because the number Z of trailing zeroes exceeds the number P of samples in the cyclic prefix added by function 60. FIG. 6 illustrates the arrangement of two time-adjacent signal vector blocks $x_{t-1}$, $x_t$ according to this alternative embodiment of the invention. As shown in FIG. 6, signal vector block $x_t$ has a cyclic prefix consisting of P zero-valued symbols that are prepended to it, plus the Z zero-valued symbols from the trailing portion of preceding block $x_{t-1}$. In addition, the initial P samples of the following block $x_{t+1}$ are also zero-valued, because the trailing Z symbols in that block are also zero-valued. Accordingly, the effective length of the cyclic prefix is P+Z, according to this embodiment of the invention in which the number Z of zero-valued samples is equal to or greater than the number P of samples in the prepended cyclic prefix. This longer cyclic prefix is achieved without a corresponding loss in data rate.

Also according to this embodiment of the invention, receiving modem 20 may operate according to the conventional manner in which the cyclic prefix is removed by function 62. Receiving modem 20 need not be aware that transmitting modem 10 is including frequency-domain redundancy. However, the resulting signal can be recovered with perfect fidelity for transmission channel H with an impulse response longer than P samples but shorter than P+Z samples, in a manner that is effectively transparent to receiving modem 20.

According to each of the embodiments of this invention, the effect of a cyclic prefix is attained or enhanced through the use of frequency-domain redundancy, without any loss of data rate. Preferably, unloaded subchannels are encoded with a signal that constrains the trailing portion of each data frame to known values, such as zero. Because each frame is formed in this manner, this known trailing portion of each frame is repeated from frame to frame, with the trailing portion of one frame serving as a cyclic prefix to the next frame. This invention thus provides improved recovery of the original signal, even over transmission channels with relatively long impulse responses. Other advantages, such as adaptive balancing between receiver equalization and transmitter frequency-domain redundancy, and the use of underdetermined systems to include additional constraints such as power or peak-to-average ratio, are also achievable according to this invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of transmitting discrete multitone modulated signals to a receiver over a communications facility, comprising the steps of:
    determining bit loading for each of a plurality of subchannels for a communications session with the receiver;
    then identifying loaded and unloaded subchannels of the plurality of subchannels;
    deriving a transformation matrix, responsive to the identifying step, and according to a block length and a selected number of fixed-value samples;
    receiving a block of an input signal;
    modulating the received block of the input signal, using the transformation matrix, to produce a time-domain signal having a trailing portion comprised of the selected number of fixed-value samples; and
    transmitting, over the communications facility, an analog signal corresponding to the time-domain signal.

2. The method of claim 1, wherein the modulating step comprises:
encoding a first frequency-domain vector corresponding to the input signal block, the first frequency-domain vector having elements associated with each of the loaded subchannels;
performing an inverse discrete Fourier transform on the first frequency-domain vector to produce a first time-domain vector;
applying the transformation vector to the first time-domain vector to form a second frequency-domain vector having elements associated with each of the unloaded subchannels; and
performing an inverse discrete Fourier transform on the first and second frequency-domain vectors to produce the time-domain signal having a trailing portion consisting of the selected number of fixed-value samples.

3. The method of claim 2, wherein the fixed-value samples are zero-valued.

4. The method of claim 2, wherein the fixed-value samples are non-zero-valued.

5. The method of claim 4, wherein the values of the fixed-value samples represent a signature value for the receiver.

6. The method of claim 5, further comprising:
operating the receiver to estimate crosstalk from received signals having signature values other than the receiver's own signature value.

7. The method of claim 4, wherein the values of the fixed-value samples represent a pilot signal.

8. The method of claim 2, wherein the number of unloaded subchannels is equal to the selected number of fixed-value samples.

9. The method of claim 2, wherein the number of unloaded subchannels is not equal to the selected number of fixed-value samples.

10. The method of claim 9, wherein the number of unloaded subchannels is greater than the selected number of fixed-value samples.

11. The method of claim 10, wherein the step of deriving a transformation matrix comprises:
minimizing a cost function corresponding to a constraint.

12. The method of claim 11, wherein the constraint corresponds to transmission power, so that the transformation matrix minimizes the power of the signals corresponding to the unloaded subchannels.

13. The method of claim 11, wherein the constraint corresponds to peak-to-average ratio, so that the transformation matrix minimizes the peak power of the transmitted signal relative to the average power of the transmitted signal.

14. The method of claim 9, wherein the number of unloaded subchannels is less than the selected number of fixed-value samples.

15. The method of claim 2, further comprising:
selecting a group of the plurality of subchannels to be unloaded to achieve a desired condition of the transformation matrix.

16. The method of claim 2, wherein the transmitting step transmits the analog signal without adding a cyclic prefix.

17. The method of claim 2, further comprising:
prior to the transmitting step and after the modulating step, prepending a cyclic prefix including at least some of the selected number of fixed-value samples from the trailing portion.

18. The method of claim 17, wherein the cyclic prefix is longer than the selected number of fixed-value samples from the trailing portion.

19. The method of claim 18, wherein the cyclic prefix is shorter than the selected number of fixed-value samples from the trailing portion.

20. An apparatus for modulating and transmitting a discrete multitone signal to a receiver over a communications facility, comprising:
analog front end circuitry for coupling to the communications facility, for receiving a digital datastream and for transmitting a corresponding analog signal over the communications facility;
a host interface, for coupling to a host source of data to be transmitted; and
digital signal processing circuitry, coupled to the host interface and to the analog front end circuitry, for receiving data from the host source and for producing a digital datastream corresponding to this data and forwarding the digital datastream to the analog front end circuitry for transmission, the digital signal processing circuitry programmed to perform a sequence of operations comprising:
determining bit loading for each of a plurality of subchannels for a communications session with the receiver;
then identifying loaded and unloaded subchannels of the plurality of subchannels;
deriving a transformation matrix, responsive to the identifying step, and according to a block length and a selected number of fixed-value samples;
receiving a block of an input signal; and
modulating the received block of the input signal, using the transformation matrix, to produce the digital datastream in the form of a time-domain signal having a trailing portion comprised of the selected number of fixed-value samples.

21. The apparatus of claim 20, wherein the modulating operation comprises:
encoding a first frequency-domain vector corresponding to the input signal block, the first frequency-domain vector having elements associated with each of the loaded subchannels;
performing an inverse discrete Fourier transform on the first frequency-domain vector to produce a first time-domain vector;
applying the transformation vector to the first time-domain vector to form a second frequency-domain vector having elements associated with each of the unloaded subchannels; and
performing an inverse discrete Fourier transform on the first and second frequency-domain vectors to produce the time-domain signal having a trailing portion consisting of the selected number of fixed-value samples.

22. The apparatus of claim 21, wherein the fixed-value samples are zero-valued.

23. The apparatus of claim 21, wherein the fixed-value samples are non-zero-valued.

24. The apparatus of claim 23, wherein the values of the fixed-value samples represent a signature value for the receiver.

25. The apparatus of claim 23, wherein the values of the fixed-value samples represent a pilot signal.

26. The apparatus of claim 21, wherein the number of unloaded subchannels is equal to the selected number of fixed-value samples.

27. The apparatus of claim 21, wherein the number of unloaded subchannels is not equal to the selected number of fixed-value samples.

28. The apparatus of claim 27, wherein the number of unloaded subchannels is greater than the selected number of fixed-value samples.

29. The apparatus of claim 28, wherein the operation of deriving a transformation matrix comprises:
minimizing a cost function corresponding to a constraint.

30. The apparatus of claim 29, wherein the constraint corresponds to transmission power, so that the transformation matrix minimizes the power of the signals corresponding to the unloaded subchannels.

31. The apparatus of claim 29, wherein the constraint corresponds to peak-to-average ratio, so that the transformation matrix minimizes the peak power of the transmitted signal relative to the average power of the transmitted signal.

32. The apparatus of claim 27, wherein the number of unloaded subchannels is less than the selected number of fixed-value samples.

33. The apparatus of claim 21, wherein the sequence of operations further comprises:
selecting a group of the plurality of subchannels to be unloaded to achieve a desired condition of the transformation matrix.

34. The apparatus of claim 21, wherein the digital datastream comprises a plurality of blocks, wherein the blocks do not include a cyclic prefix.

35. The apparatus of claim 21, wherein the sequence of operations further comprises:
prepending a cyclic prefix including at least some of the selected number of fixed-value samples from the trailing portion.

36. The apparatus of claim 35, wherein the cyclic prefix is longer than the selected number of fixed-value samples from the trailing portion.

37. The apparatus of claim 36, wherein the cyclic prefix is shorter than the selected number of fixed-value samples from the trailing portion.

38. The apparatus of claim 20, wherein the digital signal processing circuitry comprises a programmable digital signal processor integrated circuit.

39. A method of communicating a discrete multitone modulated signals from a transmitter to a receiver, comprising the steps of:
operating the transmitter to communicate, to the receiver, information corresponding to a plurality of subchannels available for being unloaded, and information corresponding to a trailing sequence length;
then operating the receiver to select subchannels to be unloaded, and to communicate information identifying the selected subchannels to the transmitter;
then operating the transmitter to communicate the discrete multitone modulated signals, by repeatedly performing a sequence of operations comprising:
deriving a transformation matrix, responsive to the selected subchannels communicated by the receiver, and according to a block length and to the trailing sequence length;
receiving a block of an input signal;
modulating the received block of the input signal, using the transformation matrix, to produce a time-domain signal having a trailing portion comprised of the selected number of fixed-value samples; and
transmitting, to the receiver, an analog signal corresponding to the time-domain signal.

40. The method of claim 39, wherein the information corresponding to a plurality of subchannels available for being unloaded, and information corresponding to a trailing sequence length, comprises a plurality of sets of unloaded subchannels, each set associated with a trailing sequence length value;
and wherein the step of operating the receiver comprises selecting one of the plurality of sets of unloaded subchannels, and communicating an identification of the selected set to the transmitter.

41. The method of claim 40, further comprising:
after at least one instance of the transmitting step, operating the receiver to select a different one of the plurality of sets of unloaded subchannels, and to communicate an identification of the different selected set to the transmitter; and
then operating the transmitter to derive a second transformation matrix, responsive to the different selected set of unloaded subchannels communicated by the receiver, and according to a block length and to the trailing sequence length associated with the different selected set.

42. The method of claim 39, wherein the information corresponding to a plurality of subchannels available for being unloaded, and information corresponding to a trailing sequence length, comprises a range of allowed unloaded subchannels, and a range of a trailing sequence length values;
and wherein the step of operating the receiver comprises selecting a group of subchannels to be unloaded from within the range of allowed unloaded subchannels, selecting a trailing sequence length value, and communicating an identification of the selected group of subchannels and the selected trailing sequence length value to the transmitter.

43. The method of claim 42, further comprising:
after at least one instance of the transmitting step, operating the receiver to select a different group of subchannels to be unloaded from within the range of allowed unloaded subchannels, to select a different trailing sequence length value, and to communicate an identification of the different selected group of subchannels and the different trailing sequence length value to the transmitter; and
then operating the transmitter to derive a second transformation matrix, responsive to the different selected group of subchannels communicated by the receiver, and according to a block length and the different trailing sequence length value communicated by the receiver.

* * * * *